United States Patent
Wagner et al.

(10) Patent No.: US 7,160,833 B2
(45) Date of Patent: Jan. 9, 2007

(54) SPRAY-DRIED POLYMERIZATION CATALYST AND POLYMERIZATION PROCESS EMPLOYING SAME

(75) Inventors: Burkhard Eric Wagner, Highland Park, NJ (US); Mark Wilton Smale, Midland, MI (US); Robert James Jorgensen, Scott Depot, WV (US)

(73) Assignee: Dow Global Technologies Inc., Midland MI ( * ) Notice: Subject to any disclaimer, the term of this patent is extended or adjusted under 35 U.S.C. 154(b) by 218 days.

(21) Appl. No.: 10/889,813

(22) Filed: Jul. 13, 2004

(65) Prior Publication Data

US 2004/0259723 A1 Dec. 23, 2004

Related U.S. Application Data

(62) Division of application No. 10/196,663, filed on Jul. 15, 2002, now Pat. No. 6,806,221.

(51) Int. Cl.
*C08F 4/02* (2006.01)
*B01J 31/00* (2006.01)

(52) U.S. Cl. ............... 502/133; 502/103; 502/104; 502/87; 502/121; 502/122; 502/125; 526/348; 526/123.1; 526/138; 526/129; 526/145; 526/158; 526/124.3

(58) Field of Classification Search ............. 526/348, 526/123.1, 138, 129, 145, 158, 124.3; 502/103, 502/104, 87, 121, 122, 125, 133
See application file for complete search history.

(56) References Cited

U.S. PATENT DOCUMENTS 4,728,705 A * 3/1988 Nestlerode et al. ...... 526/125.3
5,290,745 A * 3/1994 Jorgensen et al. .......... 502/109

* cited by examiner

*Primary Examiner*—Ling-Sui Choi

(57) ABSTRACT

A spray-dried composition comprising the reaction product of a magnesium halide, a solvent, an electron donor compound, and a transition metal compound and an inert filler comprising substantially spherical particles having an average particle size ranging from about 1 µm to about 12 µm, and a polymerization process using the same.

20 Claims, 4 Drawing Sheets

SPRAY-DRIED POLYMERIZATION CATALYST AND POLYMERIZATION PROCESS EMPLOYING SAME

CROSS REFERENCE TO RELATED APPLICATION

This is a divisional of U.S. patent application Ser. No. 10/196,663, filed Jul. 15, 2002 now U.S. Pat. No. 6,806,221.

FIELD OF THE INVENTION

This invention relates to catalyst compositions, methods of making such compositions, and methods for making polymers therefrom.

BACKGROUND OF THE INVENTION

The properties of polymers depend upon the properties of the catalyst used in their preparation. In catalysts for gaseous polymerization, control of the shapes, sizes, and the size distribution of the catalyst is important to ensure a good commercial workability. This is particularly important in gas phase and slurry polymerization. For example, in order to produce copolymers of 1000 μm in size, a catalyst particle size of about 30 μm to about 50 μm is generally preferred for use in the polymerization. In the copolymerization of olefins, a catalyst with a well-developed system of pores in its structure is often also advantageous. Additionally, a catalyst should have good mechanical properties to resist wear during the polymerization process and to ensure a good bulk density of the product polymer. One important aspect relating to the development of a polymerization catalyst is, therefore, the provision of a process for production of a catalyst that allows control and adjustment of the structures and sizes of the catalyst particles and particle size distribution while remaining a fairly simple process.

Spray-drying is one technique for the simple assembly and shaping of polymerization catalysts. In spray-drying, liquid droplets containing dissolved and/or suspended materials are ejected from a flywheel or a nozzle. The solvent evaporates leaving behind a solid residue. The resulting particle size and shape is related to the characteristics of the droplets formed in the spraying process. Structural reorganization of the particle can be influenced by changes in volume and size of the droplets. Depending on conditions of the spray drying process, either large, small, or aggregated particles may be obtained. The conditions may also produce particles that are compositionally uniform or mixtures of solution components. The use of inert fillers in spray-drying can help control shape and composition of the particles.

Numerous spray-dried olefin polymerization catalysts containing magnesium and titanium and production processes utilizing them have been reported. Inert fillers are sometimes used to control the shape of the resulting catalyst precursor or catalyst support by providing bulk to the solid composition. However, fillers that are small compared to the dimension of the sprayed droplet or dried particle are used because relatively large fillers lead to the formation undesirable amounts of very small catalyst particles. Such small catalyst particles contaminate the resin with particulate residues that lead to gel formation. While the small fillers reduce problems with gel formation, when they are formed into larger catalyst particles, diffusion related problems arise during subsequent activation processes and during the polymerization process. For instance, during the activation process, the cocatalyst tends to activate only a shallow region of the particle near the particle surface because the cocatalyst is unable to penetrate the interior regions of the particles. These relatively large and dense particles also inhibit the diffusion of monomers into the interior region catalyst particles during the polymerization process.

SUMMARY OF THE INVENTION

The aforementioned need is fulfilled by one or more aspects of the invention disclosed herein. In one aspect, the invention relates to a composition of spray-dried particles. The particles comprise a substantially spherical inert filler particle having an average size of about 1 to about 12 μm.

In another aspect, the invention relates to a method of making composition of spray-dried particles. The method includes providing a solution or mixture comprising a reaction product of a magnesium halide, a solvent, and a transition metal compound wherein the transition metal is selected from Groups 3–10 and Lanthanides; contacting the solution with an inert filler comprising substantially spherical particles having an average size of about 1 to about 12 μm to form a slurry, and spray-drying the slurry to form a spray-dried particle.

In still another aspect the invention relates to a method of making a polymer. The method of making the polymer includes reacting at least one olefin monomer in the presence of a spray-dried catalyst particle comprising a mixture or reaction product of a magnesium halide, a solvent, and a transition metal compound wherein the transition metal is selected from Groups 3–10 and Lanthanides; a substantially spherical inert filler having an average size of about 1 to about 12 μm, and a cocatalyst.

DESCRIPTION OF EMBODIMENTS OF THE INVENTION

Figure 1:
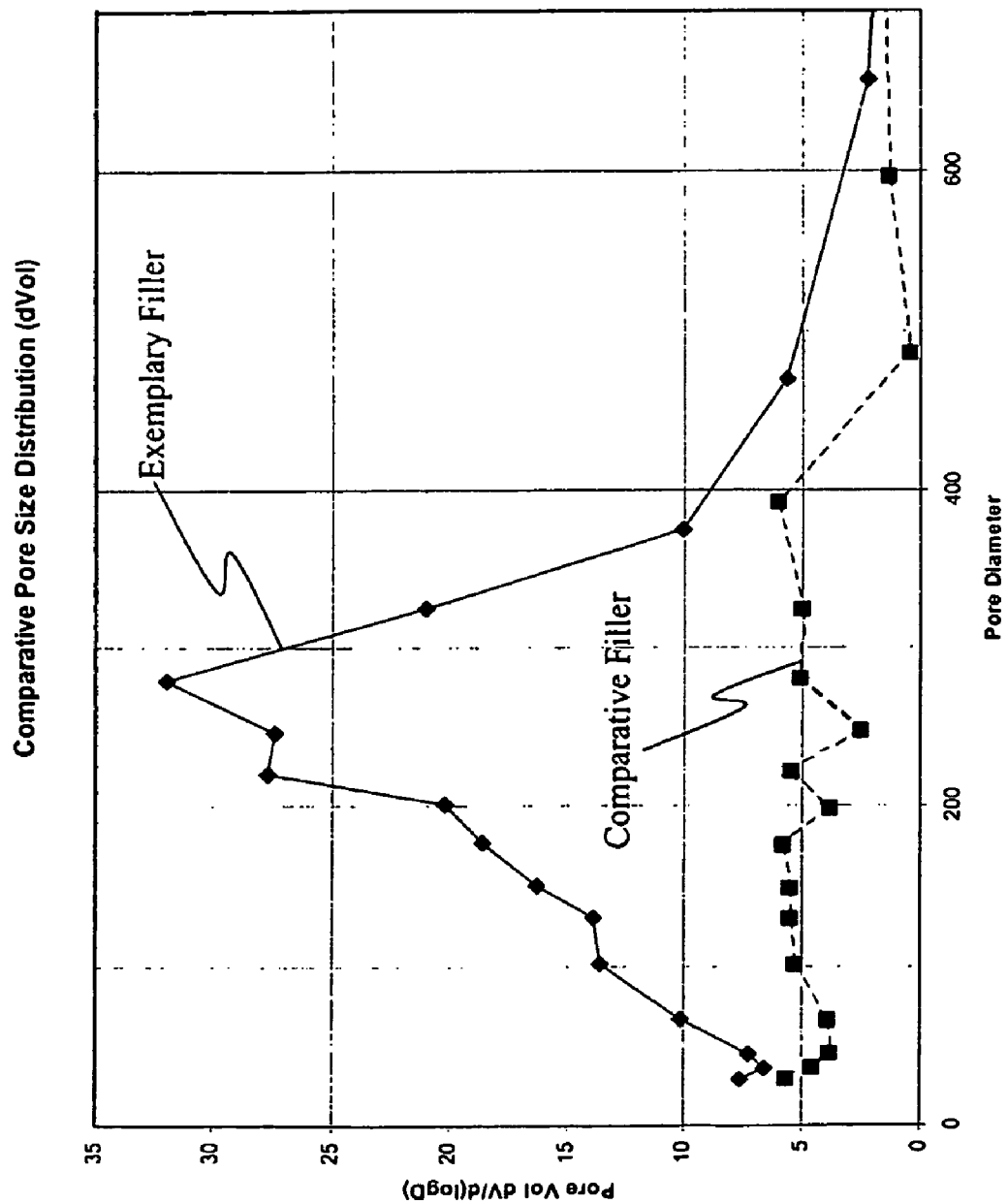
FIG. 1 is a graphical illustration of the pore diameter and volume of the filler in embodiments of the catalyst composition.

A composition of spray-dried particles comprising 1) a mixture or reaction product of a magnesium halide, a solvent, and a transition metal compound wherein the transition metal is selected from Groups 3–10 and Lanthanides; and 2) a substantially spherical inert filler having an average size ranging from about 1 μm to about 12 μm is disclosed. In some embodiments the mixture or reaction product includes an electron donor compound. In some other embodiments, the composition includes one electron donor compound and is substantially free of other electron donor compounds. Catalysts made from such compositions by combination of the precursor with a cocatalyst and an optional Lewis Acid or alkylating agent are disclosed. Methods of making these compositions and polymerization processes are also disclosed.

Some catalysts described herein provide additional versatility to the design of polyolefin catalyst properties using an inert filler having certain properties. Some fillers are useful due to there ability to effect the rate of droplet drying during spray drying. Others introduce porosity into the spray-dried particle. In some embodiments, spray dried particles include at least 2 filler particles therein. In some instances the fillers improve the cohesiveness of the resultant polymer particle. Still other fillers are relatively large, yet can self-destruct during the subsequent olefin polymerization.

In the following description, all numbers disclosed herein are approximate values, regardless whether the word "about" or "approximately" is used in connection therewith. They may vary by up to 1%, 2%, 5%, or sometimes 10 to 20%. Whenever a numerical range with a lower limit, RL, and an upper limit RU, is disclosed, any number R falling within the range is specifically disclosed. In particular, the following numbers R within the range are specifically disclosed: R=RL+k(RU−RL), where k is a variable ranging from 1% to 100% with a 1% increment, i.e. k is 1%, 2%, 3%, 4%, 5%, . . . , 50%, 51%, 52%, . . . , 95%, 96%, 97%, 98%, 99%, or 100%. Moreover, any numerical range defined by two numbers, R, as defined above is also specifically disclosed.

Any reference herein to "electron donor compounds" refers to compounds that modify the solubility of a magnesium halide in the solvent so that the solubility does not decrease over any temperature interval up to the boiling point of the solvent. As used herein, "electron donor compounds" do not include "solvents" as they are defined below, even when such solvents have electron donor character. Exemplary electron donor compounds include alcohols, thiols, weakly donating amines and phosphines. As used herein, the term "substantially free of other electron donor compounds" means that other "electron donor compounds," as defined herein, are not present at concentrations higher than levels normally found as impurities in solvent-grade supplies of such compounds. Thus, compositions having a solvent with electron donating characteristics and an "electron donor compound" are considered to be "substantially free of other electron donor compounds." In some embodiments, "substantially free of" means less than 1%, 0.1%, 0.01%, or 0.001%.

Useful solvents include any ether, ketone, or ester compound. While such solvents possess electron donor characteristics, any reference herein to a "solvent" or "solvents" does not include those compounds defined above as "electron donor compounds." Thus, compositions that are "substantially free of other electron donor compounds" may include one or more "solvents."

As used herein the term "ether" is defined as any compound of the formula $R^1$—O—R', where $R^1$ and R' are substituted or unsubstituted hydrocarbyl groups. In some cases, $R^1$ and R' are the same. Exemplary, but not limiting, symmetric ethers are diethyl ether, diisopropyl ether, and di-n-butyl ether. Exemplary nonsymmetric ethers include ethylisopropyl ether and methylbutyl ether. Examples of suitable substituted ethers include, for example, methylallyl ether and ethylvinyl ether. In still other embodiments, $R^1$ and R' may form a fused ring that may be saturated or unsaturated. One example of such a compound is tetrahydrofuran. Another suitable such cyclic ether is 2-methyl tetrahydrofuran. Again, specifically enumerated compounds are intended only as examples of types of compounds that are suitable, however, any compound having ether $R^1$—O—R' functionality is envisioned.

As used herein, the term "ketone" is intended to indicate any compound having the formula $R^1$(C═O)R'. $R^1$ and R' may be individually substituted or unsubstituted hydrocarbyl groups as otherwise described above with reference to ethers. Exemplary ketones are acetone, methylethyl ketone, cyclohexanone, cyclopentylmethyl ketone. Halogenated ketones, such as 3-bromo-4-heptanone or 2-chlorocyclopentanone may also be suitable. Other suitable ketones may include other functional groups such as unsaturations, as in allylmethyl ketone. Each of these compounds fits the formula $R^1$(C═O)R' wherein the carbon atom of the carbonyl group of the molecule forms bonds to two other carbon atoms.

Useful esters include any compound of the general formula $R^1$(C═O)OR'. In such compounds the carbon atom of the carbonyl group forms one bond to a carbon atom and another bond to an oxygen atom. $R^1$ and R' are individually selected from substituted or unsubstituted hydrocarbyl groups and may be the same or different. In some embodiments, the ester include alkyl esters of aliphatic and aromatic carboxylic acids. Cyclic esters, saturated esters and halogenated esters are also included in this group. Exemplary, but non-limiting, esters include methyl acetate, ethyl acetate, ethyl propionate, methyl propionate, and ethyl benzoate. Again, specifically enumerated compounds are intended only as examples of types of compounds that are suitable, Any compound meeting the general formula $R^1$(C═O)OR' functionality is envisioned.

Any suitable solvent may be contacted with the magnesium source by directly mixing as magnesium halide with the solvent. In some embodiments, the magnesium halide is magnesium chloride; however, magnesium bromide and magnesium iodide may also be used. Useful sources of the halides are magnesium halides, such as $MgCl_2$, $MgBr_2$, $MgI_2$, or mixed magnesium halides such as MgClI, MgClBr, and MgBrI. In some embodiments, the magnesium halide is added to the solvent in anhydrous form. In other embodiments, the magnesium halide is added in a hydrated form.

Generally, the solvent is provided in large excess with respect to the magnesium halide. In some embodiments, the ratio of solvent to magnesium halide is about 100 to 1, in other embodiments the ratio may be even larger. In yet other embodiments, the solvent is present at a ratio of from at least about 1.0, at least about 2.0, at least about 5.0 at least about 10 or at least about 20 moles of solvent per mole of magnesium halide. In some embodiments, two or more solvents may be employed.

In some embodiments, an electron donor compound is added to the mixture of the magnesium halide and the solvent. As used herein "electron donor compounds" refers to compounds that modify the solubility of a magnesium halide in the solvent so that the solubility does not decrease over any temperature interval up to the boiling point of the solvent. As used herein "electron donor compounds" do not include "solvents" as they are previously defined, even when such solvents have electron donor character. Some mixtures of the magnesium halide and the solvent that include an electron donor compound are substantially free of other electron donor compounds. As used herein the term "substantially free of other electron donor compounds" means that other "electron donor compounds," as defined herein, are not present at concentrations higher than levels normally found as impurities in solvent-grade supplies of such compounds. Thus, compositions having a solvent with electron donating characteristics and an "electron donor compound" are considered to be "substantially free of other electron donor compounds." In some embodiments, "substantially free of" means less than 1%, 0.1%, 0.01% or 0.001%.

The electron donor compound may be added to the mixture of the solvent and the magnesium halide by any suitable means. Preferably, the electron donor compound is directly added to the mixture. In some embodiments, the electron donor compound is an alcohol, thiol, weakly donating amine, or weakly donating phosphine. The alcohol can be any one chemical compound having a general formula $R^1OH$. $R^1$ may be any substituted or unsubstituted hydrocarbyl group. In some embodiments, the alcohol is an aliphatic alcohol with from about 1 to about 25 carbon atoms. In some embodiments, the alcohol is a monodentate alcohol. As used herein the term "monodentate alcohol" refers to those in which R may be substituted, provided that the substitution does not result in a molecule with more than one hydroxyl (OH) functionality that coordinates to the magnesium atom in solution. Exemplary alcohols include methanol, ethanol, propanol, isopropanol, and butanol. Alcohols containing a longer chain aliphatic group such as 2-ethyl hexanol or 1-dodecanol also form solutions in which the solubility of the magnesium halide increases with temperature. Alcohols with more carbon atoms are also useful. The alcohol may also be a cyclic alcohol such as cyclohexanol or an aromatic alcohol such as phenol or t-butyl phenol.

The addition of small amounts of an electron donor compound (other than the solvent) to mixtures containing the solvent and a magnesium halide produces a magnesium-containing composition whose solubility increases with temperature, and whose solubility at the boiling point of solvents is relatively higher than that of magnesium halide/solvent adducts where no electron donor compound is present. The solubility is also higher than that of comparable magnesium halide/solvent adducts having additional kinds of electron donor compounds. It is believed that the addition of small amounts of an electron donor to the solvent in the presence of a magnesium halide suppresses the conversion of soluble species to polymeric adducts. In some embodiments, the soluble species correspond to the formula:

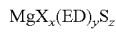

wherein X is halide, ED is an electron donor, S is selected from the group consisting of alkyl esters of aliphatic and aromatic carboxylic acids, aliphatic ethers, cyclic ether, and aliphatic ketones; x is generally 2, satisfying the oxidation state of magnesium and y is less than 4 and x+y+z is less than or equal to 6. Low concentrations of alcohol allow the formation of solutions with previously unavailable concentrations of magnesium halides present in solution. The increased concentration of dissolved magnesium halide allows the preparation of more desirable polymerization catalysts because more magnesium halide may be incorporated into the catalyst. In some embodiments, y is about 0.5, 0.75, 1, 1.5, 1.75, or 1.9 or less. In some other embodiments y is about 0.1, 0.25, 0.3 or 0.4. Such species generally have solubilities in the solvent that do not decrease from about 30° C. up to the boiling point of the solvent. Where the solvent is THF, the concentration of magnesium halide in the solution may be up to five times higher than in comparable solutions lacking an electron donor compound, especially where the electron donor compound is an alcohol. However, other embodiments wherein the molar ratio of alcohol to magnesium is higher than 1.9, such as about 2.0, about 2.1, about 2.2, about 2.5, and about 3.0 may also be useful. Such compositions are disclosed in copending applications to Burkhard E. Wagner, et al., entitled "Enhanced Solubility of Magnesium Halides and Catalysts and Polymerization Processes Employing Same", filed on Jul. 15, 2002, (U.S. Ser. No. 10/196,704) incorporated herein by reference; "Supported Polymerization Catalyst", filed on Jul. 15, 2002, (U.S. Ser. No. 10/196,682) incorporated herein by reference; and "Spray-Dried Polymerization Catalyst and Polymerization Processes Employing Same", filed on Jul. 15, 2002, (U.S. Ser. No. 10/196,705) incorporated herein by reference.

Useful catalyst precursors are formed by mixing the magnesium halide-containing solution with a transition metal compound. Suitable transition metal compounds include compounds of Group III–VI transition metals. In some embodiments the transition metal is titanium, zirconium or hafnium. In other embodiments, the metal is vanadium, niobium, or tantalum. In certain embodiments, other transition metals, such as later transition metals and Lanthanides, may be suitable.

The transition metal compound may be supplied in a variety of compositions. Some embodiments employ titanium compounds having the general formula wherein titanium is in the +4 formal oxidation state. Titanium (IV) compounds useful in preparation of the catalyst components are titanium halides and haloalcoholates corresponding the formula: $Ti(OR^2)_aX_{4-a}$ wherein $R^2$ is individually a substituted or unsubstituted hydrocarbyl group having 1 to about 25 carbon atoms, such as methyloxy, ethyloxy, butyloxy, hexyloxy, phenyloxy, decyloxy, napthyloxy, or dodecyloxy, X is any halide, and a may range from 0 to 4. Mixtures of titanium compounds can be employed if desired.

In certain embodiments, the transition metal compound is selected from titanium compounds halides and haloalcoholates having 1 to about 8 carbon atoms per alcoholate group. Examples of such compounds include $TiCl_4$, $TiBr_4$, $TiI_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti-(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$.

In other embodiments, the titanium compound is a reduced titanium halide. Useful reduced titanium halides follow the formula $TiCl_{x'}$ wherein x' ranges from greater than 0 to less than 4. In some embodiments the reduced titanium compound is $TiCl_3$, $TiBr_3$ or $TiI_3$.

The quantity of a transition metal compound or mixture of transition metal compounds, used in preparing catalysts precursors may vary widely depending on the type of catalyst desired. In some embodiments, the molar ratio of magnesium to transition metal compound may be as high as about 56, preferably about 20 to about 30. In other embodiments, the molar ratio of magnesium to transition metal compound is as low as about 0.5. Generally, molar ratios of magnesium to transition metal compound of about 3 to about 6 where the transition metal is titanium are preferred.

Forming a polymerization catalyst precursor once the components are combined may be performed in any manner. Mixing of the magnesium halide component with the transition metal compound may be performed at any suitable temperature. In some embodiments, the components are combined at a temperature ranging from about −10° C. to about 200° C. In other embodiments, they may be contacted at 0° C. to about 160° C. In other embodiments, the temperature may be about −50° C. to about 50° C. Preferably, the temperature should be below the boiling point of the solvent. In some embodiments, the magnesium halide solution and the titanium compound may be mixed for from about 5 minutes to about 24 hours. In other embodiments, 30 minutes to 5 hours are sufficient to achieve the desired concentration of magnesium halide in solution. In some embodiments, the combination of the magnesium halide solution and the transition metal component forms a reaction product that may contain a variety of species including the magnesium halide component and the transition metal compound.

In certain embodiments, the catalyst precursors comprise a composition of the formula

wherein $R^4OH$ comprises a monofunctional, linear or branched alcohol having between one and about 25 carbon atoms; $R^3$ is $R^5$ or $COR^5$ wherein each $R^5$ is individually an aliphatic hydrocarbon radical having between one and about fourteen carbon atoms or an aromatic hydrocarbon radical having between six and about 14 carbon atoms; X is individually Cl, Br, or I; S is selected from the group consisting of alkyl esters of aliphatic and aromatic carboxylic acids, aliphatic ethers, cyclic ether, and aliphatic ketones; m ranges from 0.5 to 56; n is 0, 1, or 2; p ranges from 4 to 116; q ranges from 2 to 85; and r ranges from 0.1 to 1.9.

Catalyst precursors are contacted with a substantially spherical filler to form a catalyst precursor composition. Typically a solution containing the mixture or reaction product of the magnesium-halide composition and the titanium source is contacted with the filler. The term "substantially spherical" means, as used herein, that particles have an average aspect ratio of about 1.0 to about 2.0. Aspect ratio is defined herein as the ratio of the largest linear dimension of a particle to the smallest linear dimension of the particle. Aspect ratios may be determined from Scanning Electron Micrograph (SEM) images. Of course, this definition is intended to include spherical particles which by definition have an aspect ratio of 1.0. In some embodiments, the filler particles have a average aspect ratio of about 1.8, 1.6, 1.4, or 1.2.

In addition to being substantially spherical, suitable fillers have an average size ranging from about 1 μm to about 12 μm. Any size of filler within this range may be suitable depending on the desired application. In some embodiments the average filler size is about 1 to about 20% of the size of the final spray dried particle. In certain embodiments, the filler has a diameter about 2%, about 3%, about 4%, about 5%, about 10%, or about 15% of the average diameter of the spray-dried particle. Such relatively large filler particles do not pack as densely as smaller particles. Thus, individual filler particles are separated by inter-particle voids in the spray-dried particles. These voids can be left partially unfilled by using low concentrations of the catalyst composition in the spray drying process. However, a sufficient amount of catalyst composition should be used to avoid the formation of either very small particles that average less than 1 μm in size or agglomerates that are aggregation of particles that are less than 1 μm in size. In other embodiments, such voids may be filled by the catalyst composition. Particles with large and round fillers or irregularly shaped fillers generally have relatively higher void spaces due to less efficient packing.

Fillers will also have a particle size distribution. As used herein, the terms "$D_{10}$", "$D_{50}$" and "$D_{90}$" indicate the respective percentiles of log normal particle size distribution determined by means of a Malvern® particle size analyzer using a hexane solvent. Thus, particles having a $D_{50}$ of 12 μm have a median particle size of 12 μm. A $D_{90}$ of 18 μm indicates that 90% of the particles have a particle size of less than 18 μm, and a $D_{10}$ of 8 μm indicates that 10% of the particles have a particle size of less than 8 μm. The width or narrowness of a particle size distribution can be given by its span. The span is defined as $(D_{90}-D_{10})/(D_{50})$.

Suitable fillers typically have a $D_{10}$ of about ranging from about 1.5 to about 3.0 μm. In some embodiments, the filler may have a $D_{10}$ that is outside this range. In some embodiments $D_{10}$ is about 1.8 μm, 1.9 μm, 2.0 μm, or 2.20 μm. In other embodiments, $D_{10}$ may be about 2.4 am, 2.6 μm, or about 2.8 μm. Typically the filler will also have a $D_{50}$ value ranging from about 1 μm to about 12 μm although in some embodiments the $D_{50}$ value may fall outside this range. In other embodiments, $D_{50}$ is about 3.3 μm, about 3.6 μm, about 3.9 μm, or about 4.2 μm. In yet other embodiments, the $D_{50}$ value is about 4.4 μm, about 4.71 μm, about 5.0 μm, or about 6.0 m. The filler will also have a $D_{90}$ value that is typically in the range of about 6 μm to about 12 μm. In some embodiments, $D_{90}$ is about 6.5 μm, 7.0, 7.5 μm, or 8.0. In other embodiments, $D_{90}$ is about 8.2, 8.4, 8.6, 8.8 or about 9.0 μm. In still other embodiments, the filler has a $D_{90}$ value of about 9.5, 10.0, or 11.0 μm. Suitable fillers will typically also have a span of about 1.0 to about 3.0. In some embodiments, the span is about 1.2, about 1.3, about 1.4, or about 1.5. In other embodiments, the span of the filler particles is about 1.6, or about 1.8, about 2.0, about 2.2, or about 2.5.

The size of the filler particles in the resulting spray-dried catalyst particles generally follows the size distribution inherent to the filler material. However, the size distribution of the filler incorporated into the spray-dried particle may also be determined experimentally. To experimentally determine the size distribution of the fillers incorporated, the spray-dried particle may be exposed to a solvent in which the catalyst components are soluble. Useful solvents include THF and methyl-THF. Once the catalyst components have dissolved, the remaining material can be isolated and microscopically examined.

Suitable fillers are inert to the other components of the catalyst composition, and to the other active components of the reaction system. Any solid particulate composition that is inert to the other components of the catalyst system and does not deleteriously affect the polymerization can be employed as a filler in embodiments of the invention. Such compounds can be organic or inorganic and include, but are not limited to, silicas, titanium dioxide, zinc oxide, magnesium carbonate, magnesium oxide, carbon, and calcium carbonate. In some embodiments, the filler is fumed hydrophobic silica that imparts relatively high viscosity to the slurry and good strength to the spray-dried particles. In other embodiments, two or more fillers may be used.

Some filler particles have porosity in their own right. Porosity of the filler may allow better diffusion and facilitate the destruction of the catalyst particle during polymerization. As used herein, "porosity" means that the filler particles have a cumulative pore volume of all pores discernable by nitrogen desorption that is about 1.5 to about 2.0 ml/g. In some embodiments, the filler has a total pore volume of about 1.6 ml/g. The cumulative pore volume is calculated with reference to the nitrogen desorption isotherm (assuming cylindrical pores by the B.E.T. technique as described by S. Brunauer, P. Emmet, and E. Teller in the Journal of the American Chemical Society, 60, pp 209–319 (1939) or according to ASTM Standard D3663-99, incorporated herein by reference in its entirety. Degassing was performed at room temperature. Generally, heating is not needed or should be avoided. The filler may also have a surface area ranging from about 25 $m^2/g$ to about 200 $m^2/g$. In some embodiments, the filler has a surface area of about 50 $m^2/g$, about 75 $m^2/g$ or about 100 $m^2/g$. Surface area may also be measured using the B.E.T. technique.

In some embodiments the filler has a pore mode ranging from about 50 Å to about 600 Å. The term "pore mode" as used herein means the mean pore diameter corresponding to the maximum in the log differential pore volume as a function of the differential of the pore diameter. In some embodiments, the filler has a pore mode of about 225 Å, about 250 Å, about 275, Å about 300 Å, about 350 Å, about 400 Å or about 500 Å. In some embodiments, the filler may have an intrinsic chemical structure with such porosity or pore mode. In other embodiments, a filler having an inherently dense structure may be processed to produce filler particles having the desired porosity or pore mode. In some embodiments, the filler particles have a structure in which the log differential pore volume has a value of about 7, about 10, about 12, or about 15 at the value of the pore mode. In other embodiments this value is about 20, about 30, or about 50.

FIG. 1 shows the pore mode of a porous filler of an exemplary embodiment. The pore mode was determined using the B.E.T. technique on a Quantachrome Nova 2000 instrument according to ASTM D 4641–94 assuming a cylindrical pore model and measured from the data obtained from the desorption branch. As FIG. 1 indicates, this filler has a pore mode of about 280 Å. In some fillers described herein, at least about 10% to at least about 20% of the porosity results from pores having a diameter of about 200 Å. In other embodiments, at least about 25% to at least about 70% of the porosity results from pores with a diameter of about 200 Å. Such porosity and pore modes allow the catalyst composition to penetrate into the interior of the filler particle. During subsequent polymerization, the filler particle may shatter; thereby, inhibiting the formation of gels and weak areas of the resulting polymer.

Some suitable fillers include silica, such as Gasil™, or an aluminum oxide, such as fly ash or Zeeospheres™, available from 3M Specialty Materials, 3M Center, Building 223-6S-04, St. Paul, Minn. 55144-1000. However, any porous material that is otherwise inert to the polymerization and the catalyst may be used. In some embodiments, two or more fillers may be used. The particulate compound or composition employed as filler should have an average particle size ranging from about 10 μm to about 60 μm. In some embodiments the average particle size of the filler is about 15 μm or about 25 μm. In other embodiments, the average size of the filler is about 35 μm or about 45 μm.

Whatever the choice of filler, it should be dry, that is free of absorbed water. Drying of the filler is carried out by heating it at a temperature below the sintering or melting point of the filler material. Typically, temperatures of at least 100° C. are used. Lower temperatures may be used where prolonged drying times are acceptable or where the support has a low melting or sintering temperature. Inorganic filler materials are typically dried at a temperature of about 200° C.–800° C. In addition, the filler material may be optionally treated with about 1 to 8 weight percent of one or more of the Lewis acids, such as aluminum alkyl compounds, to facilitate removal of the absorbed water. This modification of the filler by the aluminum alkyl compounds also provides the catalyst composition with increased activity and improves polymer particle morphology of the resulting ethylene polymers.

Once the dried filler is prepared, it is combined with the catalyst precursor composition solution or a slurry of the catalyst precursor composition to produce a slurry suitable for spray drying. Suitable slurries include, but are not limited to, those slurries including a filler that comprises from about 1% to about 95% by weight of the catalyst composition. In some embodiments, the filler comprises about 30%, about 40%, about 50% or about 60% by weight of the catalyst composition. When spray dried, such slurries produce discrete catalyst particles in which filler is present in an amount of from 10% percent by weight to about 95% percent by weight of the catalyst particle. In some embodiments, the filler is about 10% or 20% by weight of the spray dried catalyst particle. In other embodiments, the filler may be about 30%, about 40%, about 50%, or about 60% by weight of the spray dried catalyst particle.

Spray drying may be accomplished by any suitable technique. However, the catalysts described herein are not limited to those obtained by spray-drying. Exemplary techniques for spray drying are disclosed in U.S. Pat. Nos. 4,293,673 and 4,728,705, both of which are incorporated herein by reference. In embodiments of the invention, spray-drying is typically accomplished by admixing a solution or slurry of the magnesium complex and titanium compound with a suitable filler. When mixing the solution or slurry with the filler, the resulting mixture may be heated and then atomized by means of a suitable atomizing device to form discrete approximately spherically shaped particles. Atomization is usually effected by passing the slurry through the atomizer together with an inert drying gas. An atomizing nozzle or a centrifugal high speed disc can be employed to effect atomization. The volumetric flow of drying gas is considerably higher than volumetric flow of the slurry to effect atomization of the slurry and removal of excess electron donor compound and other solvent. The drying gas should be nonreactive under the conditions employed during atomization. Suitable gases include nitrogen and argon. However, any other gas may be used so long as it is nonreactive and performs the desired drying of the catalyst. Generally, the drying gas is heated to a temperature less than the boiling point of the electron donor or the solvent. In some embodiments, the drying gas is heated to a temperature greater than the boiling point of the electron donor compound or solvent. In some embodiments, the drying gas is heated to about 200° C. to facilitate removal of excess electron donor. If the volumetric flow of drying gas is maintained at a very high level, it is possible to employ temperatures below the boiling point of the electron donor compound. In some embodiments, the atomization nozzle pressure is about 1 psig, about 2 psig, about 5 psig, about 10 psig, about 25 psig, or about 50 psig. In other embodiments the atomization pressure is about 100 psig, 150 psig, or about 200 psig. In centrifugal atomization, the atomizer wheel diameter is typically about 90 mm to about 180 mm. Wheel speed is adjusted to control particle size. Typical wheel speeds are from 8,000 to 24,000 rpm, although higher or lower speed scan be used if needed to obtain the desired particle size.

Of course, one skilled in the art will appreciate that the concentration of magnesium halide in the droplet formed in the spray-drying procedure will be directly related to the amount of magnesium halide in the spray-dried particle. Increased amounts of magnesium halide in the droplets of the spray-drying procedure can act to promote adhesion between large filler particles. Of course, other adhesion promotes may be used. Exemplary such compounds include, but are not limited to, aluminas and polymer resins.

A sufficient amount of filler should be admixed with the catalyst composition solution or a slurry of the catalyst composition to produce a slurry suitable for spray drying. Suitable slurries include, but are not limited to, those slurries including a filler that comprises from about 1% to about 95% by weight of the catalyst composition.

When spray dried, such slurries produce discrete catalyst particles having at least two filler particles included therein. In some embodiments the spray dried particles have three, four or five filler particles therein. Of course, in other embodiments, higher numbers of filler particles may be present as well. One method for determining the number of filler particles in a spray-dried particle is to embed the particles in a polyethylene resin that is inert to the spray-dried particle. The polyethylene resin can be polished to expose a cross-section of the spray-dried particle. Any suitable form of microscopy may then be employed to visually determine the number of filler particles in the spray-dried particle.

Generally, the filler is present in an amount of from 10% percent by weight to about 95% percent by weight of the catalyst particle. In some embodiments, the filler is about 10% or 20% by weight of the spray dried catalyst particle. In other embodiments, the filler may be about 30%, about 40%, about 50%, or about 60% by weight of the spray dried catalyst particle. The spray-dried catalyst particles have an average particle size of about 5 µm to about 100 µm. In some embodiments, the average particle size is about 10 µm, 20 µm, or 30 µm. In other embodiments, the spray-dried particles average about 40 µm, 50 µm, 60 µm, 75 µm, or 90 µm in diameter.

The spray-dried particles are also characterized by their size distribution. In some embodiments, the spray-dried catalyst particles have a span less than about 2.0, less than about 1.8, or less than about 1.6. In other embodiments, the particles have a span that is less than about 1.5, about 1.3, or about 1.1. A narrower span has a smaller percentage of particles that may be too small or too large for a given application. The desirable span varies with the application.

Figure 2:
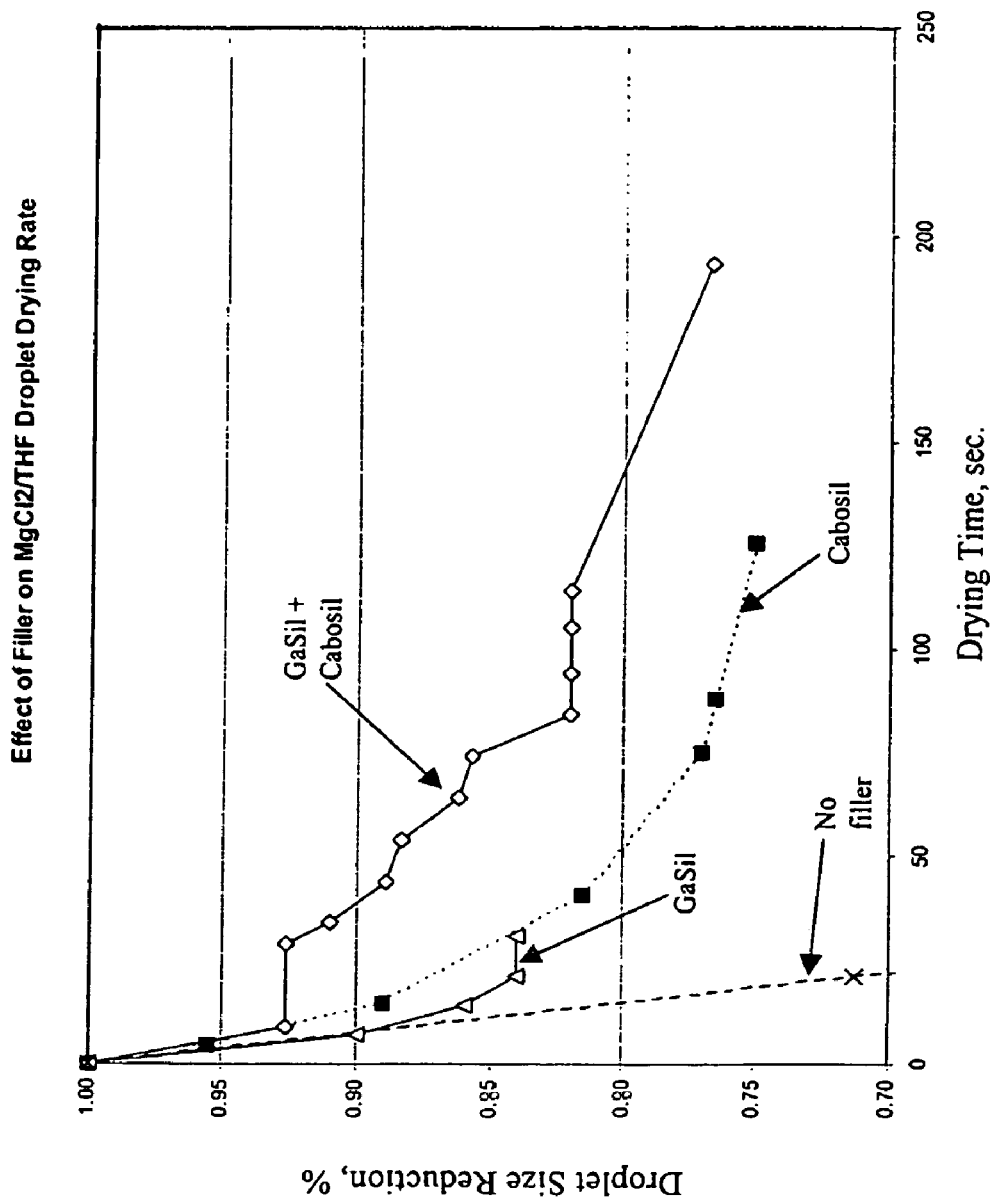
FIG. 2 illustrates the effect of different filler compositions on the droplet drying rate of a spray-drying process.

FIG. 2 illustrates the effect of different filler compositions on the droplet drying rate of the spray-drying process. As FIG. 2 shows, droplets spray-dried having no filler present show a reduction to about 70% of the original droplet size in less than about 25 seconds. Droplets having a relatively large filler, such as the synthetic amorphous silicon dioxide Gasil™ 23D available from Crosfield, are about 84% of their original size at nearly 50 seconds. However, silica having a smaller particle size, such as Cabosil™, available from Cabot Corporation, is used as the filler, the rate of decrease in droplet size is reduced. At about 125 seconds the droplet is still 75% of its original size. FIG. 2 also illustrates the effect of a combination of Cabosil™ and Gasil™ fillers. Filler compositions comprising 80% Gasil™ and 20% Cabosil™ display a slower rate of decrease in the droplet size, indicating that combinations of large and small filler particles can have a dramatic effect on the final spray dried particle.

Catalyst compositions that have been formed into a spray-dried particle have lower B.E.T. porosity than samples of the filler particles. In some embodiments, the porosity is about 0.010 ml/g, 0.015 ml/g, 0.025 ml/g. In other embodiments the porosity may be less than or greater than these values. In some embodiments, at least portion of the pores of the filler are occupied by the catalyst component. In other embodiments, greater than 50% of the pore volume is occupied by the catalyst component. In some cases, the catalyst component occupies a fraction of the pore volume resulting in a surface area of the particle of about 4.5 m²/g. The presence of the catalyst in the pores of the filler may allow for more uniform distribution of the catalyst in the particle.

In some embodiments, the spray-dried catalyst precursor composition is modified with a Lewis acid. Treatment can be effected by dissolving the Lewis acid compound(s) in an inert liquid solvent and applying the resulting solution to the spray-dried catalyst precursor composition in any convenient manner, e.g., by simply immersing the supported precursor composition in the Lewis acid solution. The solvent for the Lewis acid should be non-polar and capable of dissolving the Lewis acid compound(s) but not the precursor composition. Among the solvents which can be employed to dissolve the Lewis acid compound(s) are hydrocarbon solvents, including substituted hydrocarbon solvents, such as isopentane, hexane, heptane, toluene, xylene, naphtha and aliphatic mineral oils, such as but not limited to Kaydol™, Hydrobrite™ 1000, Hydrobrite™ 550, and the like. Preferably, such solvents are employed together with the Lewis acid compound(s) in such amounts that the resulting solution contains from about 1 percent by weight to about 25 percent by weight of the Lewis acid compound(s). If desired, the precursor composition may be added to the inert liquid solvent to form a slurry before the Lewis acid compound(s) is dissolved in the solvent. Alternatively, the Lewis acid compound(s) can be dissolved in an inert liquid solvent before it is added to the slurry. This technique is particularly suitable when a gaseous compound such as $BCl_3$ is employed. Alternatively, if desired, the Lewis acid can be directly added to the dry precursor composition.

Suitable Lewis acids are reagents which are capable of at least partially removing the electron donor without destroying the inorganic components of the precursor composition. Generally, suitable Lewis acid compounds have the structures $R^6_g AlX_{3-g}$ and $R^6_g BX_{3-g}$ wherein $R^6$ is $R^7$, $OR^7$ or $NR^7_2$ wherein $R^7$ is a substituted or unsubstituted aliphatic hydrocarbyl group containing 1 to 14 carbon atoms, or a substituted or unsubstituted aromatic hydrocarbyl radical containing from 6 to 14 carbon atoms; X is selected from the group consisting of Cl, Br, I, and mixtures thereof; and g in each case is 0–3.

Suitable Lewis acid compounds include tri-n-hexyl aluminum, triethyl aluminum, diethyl aluminum chloride, trimethyl aluminum, dimethyl aluminum chloride, methyl aluminum dichloride, triisobutyl aluminum, tri-n-butyl aluminum, diiosbutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{13}O)AlCl_2$, and the corresponding bromine and iodine compounds.

Suitable boron halide Lewis acid compounds include $BCl_3$, $BBr_3$, $B(C_2H_5)Cl_2$, $B(OC_2H_5)Cl_2$, $B(OC_2H_5)_2Cl$, $B(C_6H_5)Cl_2$, $B(OC_6H_5)Cl_2$, $B(C_6H_{13})Cl_2$, $B(OC_6H_{13})Cl_2$ and $B(OC_6H_5)_2Cl$. Bromine and iodine-containing congeners of the above-listed compounds may also be used. The Lewis acids can be used individually or in combinations thereof.

Further details concerning Lewis acids which are suitable for the present purpose can be found in U.S. Pat. Nos. 4,354,009 and 4,379,758.

The catalyst precursor is treated with an activating cocatalyst. The precursor may be treated with the cocatalyst at any point after the spray drying operation. In some embodiments, the precursor is activated before any optional treatment with a Lewis acid or alkylating agent. In other embodiments, the precursor is treated with the cocatalyst after the optional Lewis acid or alkylating agent treatment. Typically, cocatalysts follow the formula $AlX'_d(R'')_cH_e$ where X' is Cl or OR'''. R'' and R''' are individually $C_1$ to $C_{14}$ saturated hydrocarbon radicals; d is 0 to 1.5; e is 0 or 1; and c+d+e=3. Exemplary cocatalysts include $Al(CH_3)_3$, $Al(C_2H_5)_3$, Al($C_2H_5$)$_2$Cl, Al(i-$C_4H_9$)$_3$, Al($C_2H_5$)$_{1.5}$Cl$_{1.5}$, Al(i-$C_4H_9$)$_2$H, Al($C_6H_{13}$)$_3$, Al($C_8H_{17}$)$_3$, Al($C_2H_5$)$_2$H, Al($C_2H_5$)$_2$(O$C_2H_5$), or mixtures thereof.

In some embodiments, the catalyst precursor is partially activated outside the polymerization reactor with cocatalyst in a hydrocarbon slurry. This partial activation is optional. After contacting the catalyst precursor composition with the cocatalyst, the hydrocarbon solvent is removed by drying and the catalyst composition can be fed to the polymerization reactor where the activation is completed with additional amounts of any suitable cocatalyst. In the first stage the supported catalyst precursor is reacted with the cocatalyst to provide a molar ratio of Al:Ti of about 0.1, 0.5, 1, 2, 5, or 6. In some embodiments, the activation is carried out in a hydrocarbon solvent followed by drying of the resulting mixture, to remove the solvent, at a temperature of at least 20, 30 40 or 50° C. In some embodiments the temperature is less than 50, 60, 70 or 80° C. Another alternative partial activation procedure is described in U.S. Pat. No. 6,187,866 in which the partial activation procedure occurs in a continuous fashion.

In some embodiments, especially those in which the catalyst precursor has not been fully activated, additional cocatalyst can be added to the polymerization reactor to further activate the catalyst precursor. In some embodiments, the partially activated catalyst or the catalyst precursor composition and additional cocatalyst are fed into the reactor by separate feed lines. In other embodiments, a mineral oil suspension of the partially activated catalyst and the cocatalyst are supplied in one feed line to the reactor. Alternatively, a mineral oil slurry of the precursor composition can be treated with the cocatalyst, and the resultant slurry can be fed into the reactor. The additional cocatalyst may be sprayed into the reactor in the form of a solution thereof in a hydrocarbon solvent such as isopentane, hexane, or mineral oil. This solution usually contains about 2 to 30 weight percent of the cocatalyst composition. The cocatalyst may also be added to the reactor in solid form, by being absorbed on a support. In some embodiments, the support contains about 10 to about 50 weight percent of the activator for this purpose. The additional cocatalyst is added to the reactor in such amounts to produce, in the reactor, a total Al/Ti molar ratio of about 10, about 15, about 25, about 45, about 60, about 100, or about 200 to 1. In other embodiments, the ratio may be about 250 or about 400 to 1. The additional amounts of activator compound added to the reactor further activate the supported catalyst. In other embodiments, the catalyst may be activated as described in PCT publication WO 01/05845, incorporated herein by reference in its entirety.

In some embodiments, catalysts have improved productivity. Productivity is measured by ashing a sample of a product resin, and determining the weight % of ash. The ash is essentially composed of the catalyst. The productivity is calculated as pounds of polymer produced per pound of total catalyst consumed. The amount of Ti, Mg and Cl in the ash are determined by elemental analyses. In some embodiments, the productivity of the catalyst ranges from about 9000 to about 18000 for slurry polymerizations. In other embodiments, catalysts have productivity values higher or lower than this range. For gas-phase polymerizations, some inventive catalysts have a productivity ranging from about 300 to about 600. Again, other catalysts may have a productivity outside this range.

Embodiments of the catalysts described above may be used in solution, slurry or gas-phase polymerizations. Catalysts described above may be prepared for use in slurry polymerization according to any suitable techniques. In some embodiments, such catalysts are prepared in the same manner as those used in gas phase polymerizations. Slurry polymerization conditions include polymerization of $C_2$–$C_{20}$ olefin, diolefin, cycloolefin, or mixture thereof in an aliphatic solvent at a temperature below that at which the polymer is readily soluble in the presence of the supported catalyst. Slurry phase processes suited for ethylene homopolymerization and copolymerizations of ethylene with $C_3$ to $C_8$ α-olefins, such as for example, 1-butene, 1-hexene, 4-methyl-1-pentene, and 1-octene, may also be performed with embodiments of the inventive catalysts.

In a continuous gas phase process, the partially or completely activated precursor composition is continuously fed to the reactor with discrete portions of any additional activator compound needed to complete the activation of the partially activated precursor composition.

Polymerization reactions are typically conducted by contacting a stream of ethylene, in a gas phase process, such as in the fluid bed process described below, and substantially in the absence of catalyst poisons such as moisture, oxygen, CO, $CO_2$, and acetylene with a catalytically effective amount of the completely activated precursor composition (the catalyst) at a temperature and at a pressure sufficient to initiate the polymerization reaction. Embodiments of the catalyst are suitable for the polymerization of $C_2$-$C_6$ olefins including homopolymers and copolymers of ethylene with α-olefins such as, 1-butene, 1-hexene, and 4-methyl-1-pentene. In general, the reaction may be performed at any conditions suitable for Ziegler-Natta type polymerizations conducted under slurry or gas phase conditions. Such processes are used commercially for the production of high density polyethylene (HDPE), medium density polyethylene (MDPE), and linear low density polyethylene (LLDPE).

Figure 3:
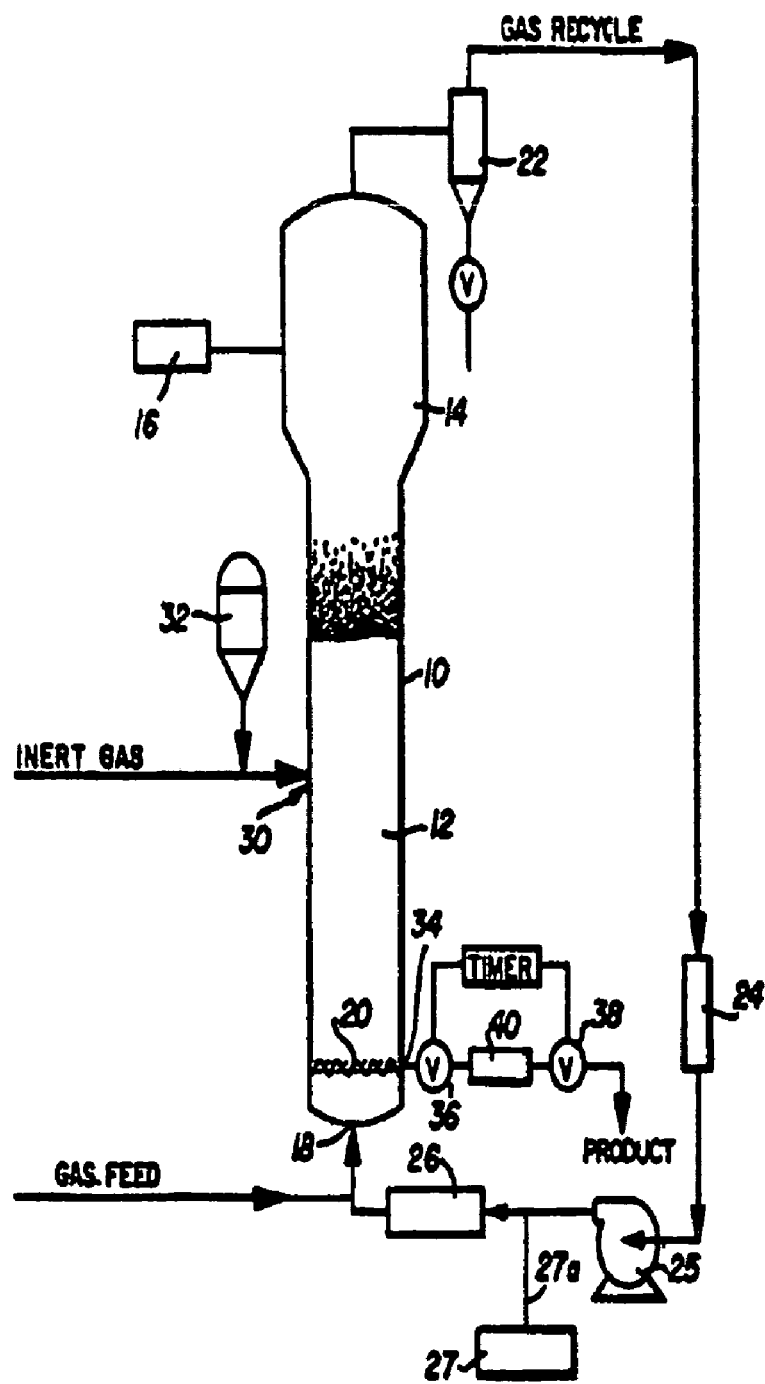
FIG. 3 illustrates a fluidized bed reaction system useful with embodiments of the inventive catalysts.

A fluidized bed reaction system can be used in gas phase polymerization. Fluid bed reaction systems are discussed in detail in U.S. Pat. Nos. 4,302,565 and 4,379,759 which are incorporated herein by reference in their entirety. However for convenience, FIG. 3 illustrates an exemplary fluid bed reactor system. The reactor 10 consists of a reaction zone 12 and a velocity reduction zone 14. The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. The mass gas flow rate through the bed is sufficient for fluidization. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966). In some embodiments the mass gas flow rate is 1.5, 3, 5, 7 or 10 times $G_{mf}$. The bed is prepared to avoid the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated catalyst used in the fluidized bed is preferably stored for service in a reservoir 32 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure proper fluidization, the recycle gas and where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the recycle line. Where desired, the recycle gas may then be passed through a preliminary heat exchanger 24 designed to cool small entrained particles to prevent sticking in the compressor or downstream heat exchanger 26.

The recycle gas is compressed in a compressor 25 and then passed through the heat exchanger 26 where it is stripped of heat of reaction before it is returned to the bed. By constantly removing heat of reaction, no noticeable temperature gradient appears to exist within the upper portion of the bed. A temperature gradient exists in the bottom of the bed in a layer of about 6 to 12 inches, between the temperature of the inlet gas and the temperature of the remainder of the bed. Thus, it has been observed that the bed acts to adjust the temperature of the recycle gas above this bottom layer of the bed zone to make it conform to the temperature of the remainder of the bed thereby maintaining itself at an essentially constant temperature under steady state conditions. The recycle is then returned to the reactor at its base 18 and to the fluidized bed through distribution plate 20. The compressor 25 can also be placed upstream of the heat exchanger 26.

The fluidized bed contains growing and formed particulate polymer particles as well as catalyst particles. Because the polymer particles are hot and active, they must be prevented from settling, to avoid fusion of the two particles. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type and the like. The elements of the plate may all be stationary, or the plate may be of the mobile type disclosed in U.S. Pat. No. 2,298,792. Whatever its design, it must diffuse the recycle gas through the particles at the base of the bed to keep them in a fluidized condition, and also serve to filler a quiescent bed of resin particles when the reactor is not in operation. The mobile elements of the plate may be used to dislodge any polymer particles entrapped in or on the plate.

Hydrogen may be used as a chain transfer agent in the polymerization reaction. The ratio of hydrogen/ethylene employed may vary between about 0 to about 2.0 moles of hydrogen per mole of the ethylene in the gas stream.

Compounds of the structure $ZnR_aR_b$, where $R_a$ and $R_b$ are the same or different $C_1$ to $C_{14}$ aliphatic or aromatic hydrocarbon radicals, may be used in conjunction with hydrogen, as molecular weight control or chain transfer agents to increase the melt index values of the polymers that are produced. About 0 to 50, and preferably about 20 to 30, mols of the Zn compound (as Zn) would be used in the gas stream in the reactor per mol of titanium compound (as Ti) in the reactor. The zinc compound would be introduced into the reactor preferably in the form of a dilute solution (2 to 30 weight percent) in hydrocarbon solvent or absorbed on a solid diluent, such as silicon dioxide, of the types described above, in amounts of about 10 to 50 weight percent. These compositions tend to be pyrophoric. The zinc compound may be added alone or with any additional portions of the activator compound that are to be added to the reactor from a feeder, not shown, which would feed the compound to the hottest portion of the gas recycle system, such as adjacent to feeder 27 disclosed herein.

Any gas inert to the catalyst and reactants can also be present in the gas stream. The activator compound is preferably added to the reaction system at the hottest portion of the recycle gas stream. Addition into the recycle line downstream from the heat exchanger is thus preferred, as from dispenser 27 through line 27A.

To insure that sintering does not occur, operating temperatures below the sintering temperature are desired. For the production of ethylene homopolymers, an operating temperature of about 30° C. to 115° C. is preferred, and a temperature of about 90° C. to 105° C. is preferably used to prepare products having a density of about 0.961 to 0.968.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst composition is injected into the bed at a rate equal to its consumption at a point 30 which is above the distribution plate 20. Injection can be continuous or intermittent. Preferably, the catalyst is injected at a point above the distribution plate. For highly active catalysts, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots."

A gas which is inert to the catalyst such as nitrogen or argon is used to carry the partially or completely reduced precursor composition, and any additional activator compound that is needed, into the bed. Alternatively, a mixture of solvents, such as isopentane, pentane, hexane, or the like, may be used as carrier for catalysts present in slurry form. Nitrogen may also be used in conjunction with the carrier.

The production rate of the bed is controlled by the rate of catalyst injection. The production rate may be increased by simply increasing the rate of catalyst injection and decreased by reducing the rate of catalyst injection.

Since changes in the rate of catalyst injection change the rate of generation of the heat of reaction, the temperature of the recycle gas is adjusted upwards or downwards to accommodate the change in rate of heat generation. This insures the maintenance of an essentially constant temperature in the bed. Complete instrumentation of both the fluidized bed and the recycle gas cooling system, is, of course, necessary to detect any temperature change in the bed to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particles settle to preclude further polymerization and sintering when the particles reach their ultimate collection zone. The suspending gas may also be used, as mentioned above, to drive the product of one reactor to another reactor.

The particulate polymer product is preferably, although not necessarily, withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation. A fluidized bed discharge process according to U.S. Pat. No. 4,621,952, incorporated herein by reference in its entirety, may also be used.

Finally, the fluidized bed reactor is equipped with an adequate venting system to allow venting the bed during start up and shut down. The reactor does not require the use of stirring means and/or wall scraping means.

The catalyst system described herein appears to yield a fluid bed product with an average particle size between about 0.005 to about 0.06 inches, sometimes about 0.02 to about 0.04 inches and having a catalyst residue that is unusually low.

The feed stream of gaseous monomer, with or without inert gaseous diluents, is fed into the reactor at a space time yield of about 2 to 10 pounds/hour/cubic foot of bed volume.

The molecular weight of polymers made by any suitable process is conveniently indicated using melt flow measurements. One such measurement is the melt index (MI), obtained according to ASTM D-1238, Condition E, measured at 190° C. and an applied load of 2.16 kilogram (kg), reported as grams per 10 minutes. Some polymers prepared using some catalysts described herein have MI values ranging from about 0.1 to. about 1000 grams/10 minutes. Other polymers may have MI values outside this range. Melt flow rate is another method for characterizing polymers and is measured according to ASTM D-1238, Condition F, using 10 times the weight used in the melt index test above. The melt flow rate is inversely proportional to the molecular weight of the polymer. Thus, the higher the molecular weight, the lower the melt flow rate, although the relationship is not linear. The melt flow ratio (MFR) is the ratio of melt flow rate to the melt index. This correlates with the molecular weight distribution of the product polymer. Lower MFRs indicates narrower molecular weight distributions. Polymers prepared using some catalysts described herein have MFR values ranging from about 20 to about 40.

Average particle sizes are calculated from sieve analysis data according to ASTM D-1921, Method A, using a 500 g sample. Calculations are based on weight fractions retained on the screens. Bulk Density is determined according to ASTM D-1895, Method B by pouring the resin into a 100 ml graduated cylinder to the 100 ml line without shaking the cylinder, and weighed by difference.

Polymers may also be characterized by their density. Polymers herein may have a density of from about 0.85 to about 0.98 g/cm³ as measured in a density gradient column in accordance with ASTM D-792 in which a plaque is made and conditioned for one hour at 100° C. to approach equilibrium crystallinity.

EXAMPLES

The following examples are given to illustrate various embodiments of the invention described herein. They should not be construed to limit the invention otherwise as described and claimed herein. All numerical values are approximate.

1. Preparation of the Spray-Dried Precursors (A) Precursor Slurry/Solution. Preparative amounts are listed in Table I. All operations were conducted under nitrogen with water-free reagents. To a 40 l stainless steel mix vessel were added the required charge of tetrahydrofuran (THF), then the indicated charge of filler. The slurry was stirred at room temperature for 30 minutes. Then was added the listed small amount of triethylaluminum (10% in THF) to remove residual moisture from the filler and the solvent. The slurry was stirred for 15 minutes, and the required amounts of solid $MgCl_2$ and aluminum-reduced $TiCl_3$ were added. The required amount of absolute ethanol was then added either before or after the addition of the metal salts. The internal temperature was raised to 60° C., and the slurry was stirred for 5 hours maintained at an internal temperature of 60–70° C.

The Spray-Drying Operation. The resulting slurry containing dissolved $MgCl_2$ and $TiCl_3$ was then spray-dried under differing process conditions using an 8-foot diameter closed cycle spray dryer equipped with a rotary atomizer. The rotary atomizer speed was adjusted over the 50%–95% set speed to produce particles with a wide range of particle sizes. Maximum wheel speed corresponds to about 24,000 rpm. The scrubber section of the spray dryer was maintained at approximately −4° C.

TABLE I

| Preparation | THF, (kg) | Filler Type | Amount (Kg) | Et₃Al, 10% (g) | Et₃Al, (mol) | MgCl₂ (g) | MgCl₂ (mol) | TiCl₃-AA (g) | TiCl₃-AA (mol) | EtOH (g) | EtOH (mol) | EtOH Mg | Nominal [MgCl₂], molal |
|---|---|---|---|---|---|---|---|---|---|---|---|---|---|
| A | 29.12 | G | 2.13 | 1590 | 1.39 | 2290 | 31.4 | 554 | 2.79 | 1775 | 29.95 | 1 | 1 |
| A' | 16.8 | G | 1.22 | 2240 | 1.83 | 1322 | 18.13 | 320 | 1.62 | 795 | 31.75 | 1 | 1.3 |

TABLE I-continued

| Preparation | THF, (kg) | Filler Type | Amount (Kg) | Et₃Al, 10% (g) | Et₃Al, (mol) | MgCl₂ (g) | MgCl₂ (mol) | TiCl₃-AA (g) | TiCl₃-AA (mol) | EtOH (g) | EtOH (mol) | EtOH Mg | Nominal [MgCl₂], molal |
|---|---|---|---|---|---|---|---|---|---|---|---|---|---|
| B | 25.1 | G | 1.62 | 1520 | 1.33 | 3335 | 35.05 | 1200 | 6.04 | 1460 | 31.75 | 1 | 1.3 |
| C | 15.5 | 80% G 20% C | 1.0 0.25 | 940 | 0.82 | 2070 | 21.75 | 744 | 3.75 | 905 | 19.7 | 1 | 1.3 |
| Comp1 | 36.2 | C | 2.51 | 450 | 0.39 | 1805 | 18.9 | 667 | 3.36 | 750 | 16.3 | 1 | 1 |
| Comp2 | 28 | C | 1.7 | 770 | 0.67 | 3124 | 32.8 | 1053 | 5.30 | 1542 | 33.5 | 1 | 1 |

G = Gasil ™
C = Cabosil ™

Nitrogen gas was introduced into the spray dryer at inlet temperatures in the 130–160° C. range and was circulated at a rate of approximately 200–300 kg/hour. The Cabosil™/THF slurry containing dissolved MgCl₂ and TiCl₃ was fed to the spray dryer at a temperature of about 65° C. and a rate sufficient to yield an outlet gas temperature of approximately 90–115° C. The spray drying chamber pressure was slightly above atmospheric. Analytical and morphological results are given in Table II. All of the spray-dried slurries used ethanol additive to increase the amount of MgCl₂ that can be dissolved in a spray-dried droplet. The catalysts differ from the controls in the use of large filler Gasil™ instead of Cabosil™. Preparations A, A' and Comparative Example 1 feature a high Mg/Ti ratio of greater than about 8 at a Ti loading of 0.4 to 0.5 mmol Ti/g precursor. Preparation C and Comparative Example 2 have a Mg/Ti ratio of about 5 to about 6, but at a high Ti loading of about 0.6 mmol Ti/g, so that there is proportionally more of both metal salts in each particle at the expense of filler content. In catalyst A', an additional charge of Et₃Al was added after the ethanol modifier to demonstrate that the added Et₃ μl had no effect on catalyst preparation and performance except for its role as scavenger of moisture.

In catalysts A, A', and B, the filler was exclusively Gasil™ in the indicated amounts; comparative catalyst precursors Comparative Example 1 and Comparative Example 2 had Cabosil™ as the filler. In contrast, catalyst precursor C had a 4:1 wt/wt. Gasil™/Cabosil™ mixed filler content. In all cases, total filler loadings were about 15 to about 25% of total weight.

The particle size distributions of all spray-dried catalyst precursors were similar; differences in average particle sizes can be accounted for by the level of metal salts in the particles. None of the inventive catalyst precursors had fines at the low end of the particle size distribution that would predict extensive fines generation by replication into polymer particle fines. Resin fines were measured by determining the weight percent of polymer particles that passed through a 120 mesh US standard screen. Spray-drying of particles containing large fillers thus is entirely feasible at the employed loadings of metal salts, and does not appear to lead to particles that are prone to disintegrate during the drying process.

TABLE II

| Example | Atomizer Set, % | Ti mmol/g | Mg mmol/g | Mg/Ti | % THF | % EtOH | Filler Wt. % | Pore Vol., cc/g | D₉₀ | D₅₀ | D₁₀ | Span |
|---|---|---|---|---|---|---|---|---|---|---|---|---|
| A | 95 | 0.381 | 3.60 | 8.8 | 29.2 | 3.01 | 25.7 | 0.53 | 36.4 | 19.5 | 7.86 | 1.5 |
| A' | 95 | 0.389 | 3.40 | 8.3 | 29.4 | 3.78 | 23.6 |  | 33.9 | 17.4 | 6.9 | 1.5 |
| Comp. 1* | 85 | 0.41 | 3.63 | 8.9 | 32 | 5.1 | 23.6 | 0.49 | 58.7 | 29.98 | 12.82 | 1.5 |
| B | 95 | 0.63 | 3.58 | 5.6 | 32.68 | 4.18 | 17.5 | 0.44 | 65.34 | 33.94 | 12.38 | 1.6 |
| C | 95 | 0.57 | 3.34 | 5.6 | 32.05 | 3.89 | 18.2 | 0.39 | 51.1 | 26.43 | 10.1 | 1.6 |
| Comp. 2* | 95 | 0.6 | 3.62 | 6 | 36 | 6.2 | 14.4 | 0.35 | 50.48 | 25.75 | 9.19 | 1.6 |

Ethylene Polymerization Process in a Slurry Reactor

The catalyst precursors of Table II were used in ethylene polymerization trials, the results of which are shown in Table III. Each laboratory scale polymerization trial was conducted as follows, except as otherwise noted. To 500 ml of hexane were added 40–60 μmol of triethylaluminum (C₂H₅)₃Al per μmol of titanium in the catalyst, then 5–7 μmols Ti as slurry of catalyst precursor in mineral oil was added to the reactor. The 1 liter slurry reactor was pressurized to fifty (50) psig with hydrogen gas, then further pressurized to a total of two hundred (200) psig with ethylene. The polymerization was conducted at a temperature of 85° C. for thirty minutes.

Table III demonstrates that the productivity of the inventive catalysts is about 50% higher on a Ti basis than the productivity of the catalysts based on the smaller Cabosil™ filler. The molecular weight distribution of resins made from the catalysts containing exclusively the large Gasil™ filler (A, A', B) is narrower than that of the resins from the controls. Catalyst C, which contained both Gasil™ and Cabosil™, gave a broader molecular weight distribution than either the corresponding catalyst B having only the Gasil™ filler or Comparative Example 2 which had only Cabosil™. Some catalysts described herein gave resins with about 0.2 cc/g higher internal pore volume as measured by pore filling experiments when butanol was used as a slurrying agent, than resins from precursors filled with Cabosil™. Resin bulk densities thus tended to be slightly lower due to increased internal porosity.

TABLE III

| Experiment | Mg/Ti | ROH/Mg | Ti Loading, mmol/g | Activity[a] | Productivity[b] | MI, dg/min | MFR | Bulk Density, g/cc |
|---|---|---|---|---|---|---|---|---|
| A | 8.8 | 1 | 0.381 | 32840 | 12600 | 0.8 | 29 | 0.284 |
| A' | 8.3 | 1 | 0.389 | 34800 | 13500 | 0.9 | 28 | 0.346 |
| Comp. 1* | 9 | 1 | 0.41 | 23000 | 9500 | 0.9 | 35 | 0.33 |
| B | 5.6 | 1 | 0.63 | 28300 | 17600 | 1.5 | 29 | 0.236 |
| C | 5.9 | 1 | 0.57 | 29000 | 17500 | 1.6 | 32 | 0.246 |
| Comp. 2* | 6 | 1 | 0.6 | 19200 | 11600 | 1.4 | 30 | 0.26 |

*Comparative example;
[a] in g PE/(mmol titanium-hr-100 psi $C_2$);
[b] in g PE/(g catalyst-hr-100 psi $C_2$)

Ethylene Polymerization Process in a Fluid Bed Reactor

The catalyst precursors of Table II were used in ethylene polymerization trials, the results of which are shown in Table IV.

Table IV shows the fluid bed HDPE polymerization properties of catalyst B compared with properties obtained with either a commercial spray-dried 6:1 Mg/Ti catalyst containing Cabosil™ as filler, or with the Cabosil™-containing Comparative Example 2 catalyst described above. Catalysts B and Comparative Example 2 were both prepared in a medium scale pilot plant as described above, while catalyst Comparative Example 3 (Cabosil™ filler) was prepared in a commercial large-scale facility. Table IV demonstrates that the inventive catalyst B matches the productivity of the commercial catalyst Comparative Example 3, but has only about half the resin fines despite the higher porosity and slightly lower resin bulk density. The resin average particle size of 0.042 inches is more advantageous than the 0.032 inches obtained with the commercial control. The comparison of inventive catalyst B with the control Comparative Example 2 shows that the inventive catalyst has significantly higher productivity and slightly lower bulk density than the control Comparative Example 2; resin fines of the experimental catalyst are about the same or lower than that of the Comparative Example 2 control, again attesting to the structural stability of the catalyst B.

Examination under the microscope of pressed films of resin from catalyst B did not show 1–10 micrometer particulate residues which would have been expected if the filler had remained intact during the polymerization.

Figure 4:
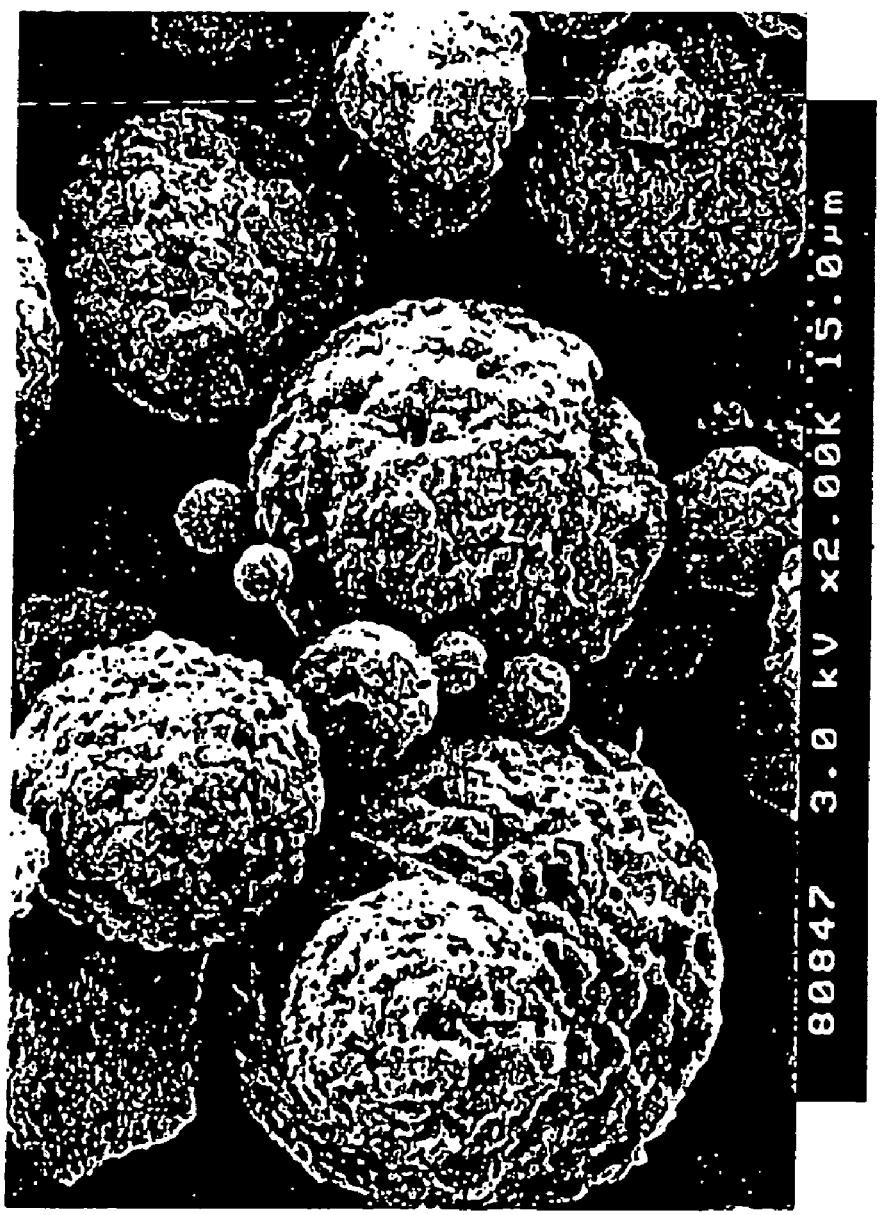
FIG. 4 illustrates the scanning electron microscopy (SEM) of an embodiment of the catalyst and a fluid bed resin made therefrom.

FIG. 4 illustrates the scanning electron microscopy (SEM) image of catalyst B and fluid bed resin made therefrom. As FIG. 4 illustrates, the knobby morphology of the Gasil™ filler seen in the catalyst has replicated into the larger resin particle. The Gasil™ has expanded and stretched by a factor of 10–30 during the polymerization, indicating that the underlying Gasil™ particle has shattered.

Fluid bed copolymerization reactions of ethylene and 1-hexene were preformed to investigate the effect of particle porosity on the resulting polymers. The data of Table V demonstrate the importance of improved macro- and meso-porosity in obtaining uniform polymerization properties with relatively large polyolefins catalysts. In going from precursor Comp 2 (100% Cabosil™ filler) to precursor C (mixed Cabosil™/Gasil™) to precursor A' (100% Gasil™), porosity of the precursor particle increases. Use of 80% Gasil™ and 20% small Cabosil™ filler gives only a marginal improvement, in that the small Gasil™ filler still plugs the holes between the large Gasil™ particles As a result of increased porosity, a progressively more uniform active catalyst is obtained. Catalyst activity increases, resin molecular weight distribution becomes more narrow as shown by the lower MFR, and catalyst comonomer incorporation becomes better and more uniform as shown by the lowered density and decreased hexane extractables.

As demonstrated above, embodiments of the invention provide a catalyst, a method of making a catalyst, and a method of making a polymer. The catalyst made in accordance with embodiments of the invention may have one or more of the following advantages. First, some catalysts disclosed herein disintegrate during polymerization allowing a more full polymer particle to form. Thus, the catalysts provide polymer products that have a smaller fraction of undesirably small particles. Some polymers also have surprisingly lower hexane extractables which advantageously results in reduced gel formation. The catalyst also has improved activity compared to catalysts using conventional spray-dried particles. Improved activity means that the catalysts provide a more cost-effective alternative to existing spray-dried magnesium-titanium catalysts. These advantages are provided, in part, by the a wider range of available compositions and a more uniform distribution of magnesium in the particle. Other advantages and properties are apparent to those skilled in the art.

TABLE IV

| Experiment | Mg/Ti | ROH/Mg | Ti Loading, mmol/g | Productivity, pm Ti; (kg PE/g catalyst) | Resin Density, | MI, dg/min | MFR | Bulk Density, lb/cft | Average Particle Size, inches | Resin Fines, % |
|---|---|---|---|---|---|---|---|---|---|---|
| B | 5.6 | 1 | 0.63 | 2.3 (583) | 0.963 | 7.4 | 25.7 | 24.5 | 0.042 | 1.2 |
| Comp. 2* | 6 | 1 | 0.6 | 3.7 (362) | 0.964 | 7.8 | 26 | 27.2 | 0.034 | 1.33 |
| Comp. 3 | 6 | 0 | 0.47 | 2.3 (435) | 09.64 | 8.2 | 25.4 | 25.0 | 0.032 | 2.08 |

Polymerization Conditions: 102° C. polymerization temperature, 170 psi ethylene pressure, 0.4 H2/C2.
Triethyl aluminum cocatalyst at ca. 50–60 Al/Ti ratio. Precursors modified with 0.17 tri-n-hexyl aluminum/Ti
*Comparative example.

While the invention has been described with a limited number of embodiments, these specific embodiments are not intended to limit the scope of the invention as otherwise described and claimed herein. Moreover, variations and modifications therefrom exist. For example, various other additives, not enumerated herein, may also be used to further enhance one or more properties of the catalyst and catalyst precursor compositions and polymers made therefrom.

TABLE V

| Catalyst Precursor | Filler | Productivity ppm Ti; (kg PE/g Precursor) | MI, dg/min | MFR | Resin Density, g/cc | Hexane Extractables, % | Bulk Density, lb/cft | Average Particle Size, inches |
|---|---|---|---|---|---|---|---|---|
| Comp2 | 100% Cabosil ™ | 1.6 (625) | 2.7 | 32 | 0.9176 | 4.9 | 15.8 | 0.04 |
| C | 20% Cabosil ™/ 80% GaSil ™ | 1.6 (625) | 2.5 | 30.8 | 0.9175 | 4.65 | 14.7 | 0.04 |
| A$^1$ | 100% GaSil ™ | 1.1 (910) | 2.2 | 29.2 | 0.9158 | 3.27 | 15.9 | 0.04 |

Polymerization Conditons: 84 C polymerization temperature, 300 psi pressure, $H_2/C_2$ = 0.24–0.28, $C_6/C_2$ = 0.135–0.152.
TEAL cocatalyst at ca. 50–60 Al/Ti ratio. Precursor APS 25 micrometers; Precursors modified with 0.45 TNHAL/THF; 0.2 DEAC/THF.

In other embodiments, the compositions do not include, or are substantially free of, any compounds not enumerated herein. It is understood that parameters of polymerization processes may vary, for example, in temperature, pressure, monomer concentration, polymer concentration, hydrogen partial pressure and so on. Therefore, catalysts which do not fulfill the selection criteria under one set of reaction conditions may nevertheless be used in embodiments of the invention under another set of reaction conditions. While some embodiments are described with reference to a single catalyst, it by no means precludes the use of two, three, four, five, or more catalysts simultaneously in a single reactor with similar or different capability for molecular weight and/or comonomer incorporation. In some embodiments, the catalysts may also include additives or other modifiers. It should be recognized that the process described herein may be used to make polymers which also incorporate one or more additional comonomers. The incorporation of additional comonomers may result in beneficial properties which are not available to homopolymers or copolymers. While the processes are described as comprising one or more steps, it should be understood that these steps may be practiced in any order or sequence unless otherwise indicated. These steps may be combined or separated. Any number disclosed herein should be construed to mean approximate, regardless of whether the word "about" or "approximate" is used in describing the number. Last, but not the least, the claimed catalysts are not limited to preparation via the processes described herein. They can be prepared by any suitable process. The appended claims intend to cover all such variations and modifications as falling within the scope of the invention.

What is claimed is:
1. A spray-dried catalyst composition comprising:
   a) a mixture or reaction product of:
   i) a magnesium dihalide;
   ii) a solvent selected from the group consisting of ether, ketone, and ester compounds;
   iii) a transition metal compound wherein the transition metal is selected from the group consisting of metals of Groups 3–10 and Lanthanides; and
   iv) from 0.1 to less than 4 moles based on one mole of magnesium dihalide of an electron donor selected from the group consisting of alcohols, thiols, weakly donating amines and weakly donating phosphines; and
   b) an inert filler comprising substantially spherical particles having a $D_{50}$ particle size from about 1 to about 12 micrometers.
2. The composition according to claim 1 wherein the electron donor is an alcohol.
3. The composition according to claim 2 wherein the alcohol is ethanol.
4. The composition according to claim 2 wherein the molar ratio of alcohol to magnesium dihalide is from 0.1 to 0.5.
5. The composition of claim 1 wherein the magnesium to transition metal molar ratio is greater than 5:1.
6. The composition of claim 1 wherein the magnesium dihalide is magnesium dichloride.
7. The composition of claim 1 wherein the transition metal compound is a titanium halide or a titanium haloalcoholate having 1 to 8 carbon atoms per alcoholate group.
8. The composition of claim 7 wherein the titanium compound is $TiCl_4$.
9. The composition of claim 8 wherein the magnesium halide is magnesium dichloride and the alcohol is ethanol.
10. The composition of claim 9 wherein the quantity of alcohol is from 3.01 to 4.18 percent based on total composition weight.
11. The composition of claim 1 wherein the solvent is tetrahydrofuran.
12. The composition of claim 3 wherein the solvent is tetrahydrofuran.
13. The composition of claim 6 wherein the solvent is tetrahydrofuran.
14. The composition of claim 8 wherein the solvent is tetrahydrofuran.
15. The composition of claim 10 wherein the solvent is tetrahydrofuran.
16. The composition of any one of claims 1–15 additionally comprising a Lewis acid.
17. The composition of claim 16 wherein the Lewis acid has the formula: $R_gMX_{3-g}$ wherein R is R', OR' or NR'$_2$ wherein R' is a substituted or unsubstituted aliphatic or aromatic hydrocarbyl group containing 1 to 14 carbon atoms, X is selected from the group consisting of Cl, Br, I and mixtures thereof; g ranges from 0–3, and M is aluminum or boron.
18. The composition of claim 17 wherein the Lewis acid is selected from the group consisting of tri-n-hexyl aluminum, triethyl aluminum, diethyl aluminum chloride, trimethyl aluminum, dimethyl aluminum chloride, methyl aluminum dichloride, triisobutyl aluminum, tri-n-butyl aluminum, diisobutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{13}O)AlCl_2$, $BCl_3$, $BBr_3$, $B(C_2H_5)Cl_2$, $B(OC_2H_5)Cl_2$, $B(OC_2H_5)_2Cl$, $B(C_6H_5)Cl_2$, $B(OC_6H_5)Cl_2$, $B(C_6H_{13})Cl_2$, $B(OC_6H_{13})Cl_2$, $B(OC_6H_5)_2Cl$, and combinations thereof.

19. A process for making a polymer comprising reacting at least one olefin monomer in the presence of a spray-dried catalyst composition and a cocatalyst characterized in that the spray-dried catalyst composition is a composition according to any one of claims 1–15.

20. A process for making a polymer comprising reacting at least one olefin monomer in the presence of a spray-dried catalyst composition and a cocatalyst characterized in that the spray-dried catalyst composition is a composition according to claim 16.

* * * * *